(12) United States Patent
Robinson

(10) Patent No.: US 10,917,148 B2
(45) Date of Patent: Feb. 9, 2021

(54) SYSTEMS, METHODS AND APPARATUS FOR SECURE AND EFFICIENT WIRELESS COMMUNICATION OF SIGNALS USING A GENERALIZED APPROACH WITHIN UNITARY BRAID DIVISION MULTIPLEXING

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 0 days.

(21) Appl. No.: 16/459,245

(22) Filed: Jul. 1, 2019

(65) Prior Publication Data

US 2021/0006303 A1 Jan. 7, 2021

(51) Int. Cl.
| H04B 7/08 | (2006.01) |
| H04B 7/0456 | (2017.01) |
| H04B 7/06 | (2006.01) |
| H04B 7/0452 | (2017.01) |

(52) U.S. Cl.
CPC ......... H04B 7/0456 (2013.01); H04B 7/0452 (2013.01); H04B 7/0697 (2013.01); H04B 7/08 (2013.01)

(58) Field of Classification Search
CPC .. H04B 7/0456; H04B 7/0697; H04B 7/0452; H04B 7/08
See application file for complete search history.

(56) References Cited

U.S. PATENT DOCUMENTS

| 5,237,587 A | 8/1993 | Schoolcraft |
| 5,345,599 A | 9/1994 | Paulraj et al. |
| 5,555,268 A | 9/1996 | Fattouche et al. |

(Continued)

FOREIGN PATENT DOCUMENTS

| CN | 1813435 A | 8/2006 |
| CN | 101179539 A | 5/2008 |

(Continued)

OTHER PUBLICATIONS

International Search Report and Written Opinion for PCT Application No. PCT/US2017/061489, dated Feb. 26, 2018, 8 pages.

(Continued)

*Primary Examiner* — Dac V Ha
(74) *Attorney, Agent, or Firm* — Cooley LLP

(57) ABSTRACT

A method includes generating, via a processor, multiple initial vectors, each including N elements. A code map is applied to each of the initial vectors, to produce an associated spreading code vector. Each of the spreading code vectors includes M elements, where M≥N. Using the spreading code vectors, spread signals are produced based on a complex baseband signals. The spread signals are stored in a memory operably coupled to the processor. The first and second spread signals are split into respective sets of spread signals, each uniquely associated with one of multiple transmit antennas. The first and second sets of spread signals are transmitted to respective signal receivers for detection of associated complex baseband signals based on the associated spreading code vectors.

24 Claims, 7 Drawing Sheets

(56) References Cited

U.S. PATENT DOCUMENTS

| | | | |
|---|---|---|---|
| 6,389,138 | B1 | 5/2002 | Li et al. |
| 7,376,173 | B2 | 5/2008 | Yedidia et al. |
| 7,454,084 | B2 | 11/2008 | Faber et al. |
| 9,648,444 | B2 | 5/2017 | Agee |
| 10,020,839 | B2 | 7/2018 | Robinson et al. |
| 10,491,262 | B2 | 11/2019 | Robinson et al. |
| 10,637,705 | B1 | 4/2020 | Shattil |
| 10,771,128 | B1 | 9/2020 | Sitaram et al. |
| 2002/0009209 | A1 | 1/2002 | Inoue et al. |
| 2003/0185309 | A1 | 10/2003 | Pautler et al. |
| 2003/0210750 | A1 | 11/2003 | Onggosanusi et al. |
| 2004/0059547 | A1 | 3/2004 | Aftelak |
| 2004/0105489 | A1 | 6/2004 | Kim et al. |
| 2004/0253986 | A1 | 12/2004 | Hochwald et al. |
| 2006/0109897 | A1 | 5/2006 | Guo et al. |
| 2006/0274825 | A1 | 12/2006 | Ciofi et al. |
| 2009/0046801 | A1* | 2/2009 | Pan ............... H04B 7/0452 375/267 |
| 2009/0316802 | A1 | 12/2009 | Tong et al. |
| 2010/0119001 | A1* | 5/2010 | Walton ............ H04B 7/0417 375/260 |
| 2010/0202553 | A1 | 8/2010 | Kotecha et al. |
| 2010/0329393 | A1 | 12/2010 | Higuchi |
| 2012/0093090 | A1 | 4/2012 | Han et al. |
| 2012/0257664 | A1 | 10/2012 | Yue et al. |
| 2013/0064315 | A1* | 3/2013 | Heath, Jr. ............ C23C 14/04 375/260 |
| 2013/0100965 | A1 | 4/2013 | Ohmi et al. |
| 2013/0223548 | A1 | 8/2013 | Kang et al. |
| 2014/0056332 | A1 | 2/2014 | Soualle et al. |
| 2015/0003500 | A1 | 1/2015 | Kesling et al. |
| 2015/0049713 | A1 | 2/2015 | Lan et al. |
| 2015/0171982 | A1 | 6/2015 | Wang et al. |
| 2016/0309396 | A1 | 10/2016 | Chai et al. |
| 2016/0337156 | A1* | 11/2016 | Milleth ............ H04J 11/0056 |
| 2017/0180020 | A1 | 6/2017 | Namgoong et al. |
| 2017/0288902 | A1 | 10/2017 | Rusek et al. |
| 2017/0294946 | A1 | 10/2017 | Wang et al. |
| 2017/0302415 | A1 | 10/2017 | Park et al. |
| 2017/0331539 | A1 | 11/2017 | Pham et al. |
| 2019/0075091 | A1 | 3/2019 | Shattil et al. |
| 2019/0097694 | A1 | 3/2019 | Jeon et al. |
| 2019/0158206 | A1 | 5/2019 | Li et al. |
| 2019/0268035 | A1 | 8/2019 | Robinson et al. |
| 2019/0349042 | A1 | 11/2019 | Ramireddy et al. |
| 2019/0349045 | A1 | 11/2019 | Varatharaajan et al. |
| 2019/0379430 | A1 | 12/2019 | Pekoz et al. |

FOREIGN PATENT DOCUMENTS

| | | |
|---|---|---|
| CN | 101795257 A | 8/2010 |
| CN | 103634065 A | 3/2014 |
| CN | 103716111 A | 4/2014 |
| EP | 1826915 A1 | 8/2007 |
| EP | 1883168 A2 | 1/2008 |
| EP | 3211812 A1 | 8/2017 |
| KR | 10-2010-0131373 A | 12/2010 |
| KR | 10-2013-0118525 A | 10/2013 |
| WO | WO 2008/024773 A2 | 2/2008 |
| WO | WO 2008/098225 A2 | 8/2008 |

OTHER PUBLICATIONS

Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.

Huang et al., "Multi-dimensional encryption scheme based on physical layer for fading channel," IET Communications, Oct. 2018, vol. 12, Issue 19, pp. 2470-2477.

Huo and Gong, "A New Efficient Physical Layer OFDM Encryption Scheme," IEEE INFOCOM 2014, IEEE Conference on Computer Communications, pp. 1024-1032.

International Search Report and Written Opinion for International Application No. PCT/US2020/040393, dated Sep. 3, 2020, 12 pages.

Liu et al., "Piecewise Chaotic Permutation Method for Physical Layer Security in OFDM-PON," IEEE Photonics Technology Letters, Nov. 2016, vol. 28, No. 21, pp. 2359-2362.

Ma et al., "Secure Communication in TDS-OFDM System Using Constellation Rotation and Noise Insertion," IEEE Transactions on Consumer Electronics, Aug. 2010, vol. 56, No. 3, pp. 1328-1332.

Invitation to Pay Additional Fees for International Application No. PCT/US2020/039606 dated Sep. 21, 2020, 12 pages.

International Search Report and Written Opinion for International Application No. PCT/US2020/039879, dated Oct. 9, 2020, 10 pages.

Invitation to Pay Additional Fees for International Application No. PCT/US2020/043686 dated Oct. 7, 2020, 16 pages.

Ericsson, "Signature design for NoMA," 3GPP TSG-RAN WG1 Meeting #93, Tdoc R1-1806241, Busan, South Korea, May 21-25, 2018, pp. 1-5.

International Search Report and Written Opinion for International Application No. PCT/US2020/039606, dated Nov. 25, 2020, 18 pages.

Invitation to Pay Additional Fees for International Application No. PCT/US2020/049031 dated Nov. 11, 2020, 13 pages.

Non-Final Office Action for U.S. Appl. No. 16/459,254 dated Nov. 5, 2020, 9 pages.

* cited by examiner

SYSTEMS, METHODS AND APPARATUS FOR SECURE AND EFFICIENT WIRELESS COMMUNICATION OF SIGNALS USING A GENERALIZED APPROACH WITHIN UNITARY BRAID DIVISION MULTIPLEXING

STATEMENT REGARDING FEDERAL GOVERNMENT INTEREST

This United States Government holds a nonexclusive, irrevocable, royalty-free license in the invention with power to grant licenses for all United States Government purposes.

CROSS-REFERENCE TO RELATED APPLICATIONS

This application is related to U.S. Non-Provisional patent application Ser. No. 16/416,144, filed on May 17, 2019 and titled "COMMUNICATION SYSTEM AND METHODS USING MULTIPLE-IN-MULTIPLE-OUT (MIMO) ANTENNAS WITHIN UNITARY BRAID DIVISIONAL MULTIPLEXING (UBDM)," the disclosure of which is herein incorporated by reference in its entirety for all purposes.

TECHNICAL FIELD

This description relates to systems and methods for transmitting wireless signals for electronic communications and, in particular, to systems and methods for securely transmitting signals using wireless communications.

BACKGROUND

In multiple access communications, multiple user devices transmit signals over a given communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communications channel, the sine waves represented by those symbols are superimposed to form a combined signal that is received at the receiver.

Some known approaches to wireless signal communication include orthogonal frequency-division multiplexing (OFDM), which is a method of encoding digital data on multiple carrier frequencies. OFDM methods have been adapted to permit signal communications that cope with severe conditions of communication channels such as attenuation, interference, and frequency-selective fading. Such an approach, however, does not address a desire for a physical layer of security of signal transmission. Furthermore, the OFDM signal includes relatively smaller amplitudes over very large dynamic ranges typically resulting in the use of radio frequency (RF) amplifiers with high peak to average power ratio.

Thus, a need exists for improved systems, apparatuses and methods for a secure, power efficient approach to wireless communication of signals.

SUMMARY

In some embodiments, an apparatus includes a memory and a processor. The processor implements a method including generating multiple vectors, and applying an arbitrary transformation to each of the multiple vectors to produce multiple associated transformed vectors. The arbitrary transformation can include one of a unitary transformation, an equiangular tight frame (ETF) transformation, or a nearly equiangular tight frame (NETF) transformation. The method also includes sending one or more signals representing the multiple transformed vectors to multiple transmitters for transmission of one or more signals representing the multiple transformed vectors from the multiple transmitters to multiple signal receivers. The method also includes providing the arbitrary transformation to the first signal receiver and the second signal receiver (e.g., prior to transmission of the multiple transformed vectors), for recovery of the multiple vectors at the first signal receiver and at the second signal receiver. In some instances, the method also includes providing the arbitrary transformation to the first signal receiver and the second signal receiver after the transmission of the multiple transformed vectors for recovery of the multiple vectors at the first signal receiver and at the second signal receiver.

In some embodiments, a method of using multiple-in-multiple-out (MIMO) antennas within unitary braid divisional multiplexing (UBDM) includes generating, via at least one processor, multiple initial vectors, each including N elements, where N is a positive integer. Some disclosed systems include systems comprising a plurality of signal receivers, a plurality of signal transmitters, and at least one processor operably coupled to the plurality of signal transmitters. The at least one processor is configured to generate multiple vectors, apply an arbitrary transformation to each vector from the multiple vectors to produce multiple transformed vectors, the arbitrary transformation including one of a unitary transformation, an equiangular tight frame (ETF) transformation, or a nearly equiangular tight frame (NETF) transformation, and send a signal representing the multiple transformed vectors to the multiple transmitters for transmission of the multiple transformed vectors to the multiple signal receiver antennas. In some instances, the multiple transformed vectors can have a total magnitude that substantially equal to a total magnitude of the multiple vectors.

Methods disclosed include a method comprising applying an arbitrary transformation to a plurality of vectors to produce multiple transformed vectors. The arbitrary transformation can include a unitary transformation, an equiangular tight frame (ETF) transformation, or a nearly equiangular tight frame (NETF) transformation. The method includes producing, using the arbitrary transformation, a first transformed signal based on at least a first transformed vector from the multiple transformed vectors, and producing, using the arbitrary transformation, a second transformed signal based on at least a second transformed vector from the multiple transformed vectors. The method further includes transmitting the first transformed signal, via a first communications channel, to a first signal receiver that is configured to detect the first transformed signal, and transmitting the second transformed signal, via a second communications channel (which may or may not be the same as the first communications channel), to a second signal receiver that is configured to detect the second transformed signal. The method further includes providing a signal representing the arbitrary transformation to the first signal receiver and the second signal receiver prior to transmitting the first transformed signal and transmitting the second transformed signal, for recovery of the multiple vectors at the first signal receiver and the second signal receiver based on the arbitrary transformation.

As used herein, a "transmitter" (or "signal transmitter") refers to any collection of components that are used in the transmission of signals, including any combination of, but limited to, one or more: antennas, amplifiers, cables, digital-to-analog converters, filters, up-converters, processors (e.g., for reading bits and/or mapping of bits to a baseband), etc. Similarly, as used herein, a "receiver" (or "signal receiver") refers to any collection of components that are used in receiving signals, including any combination of, but limited to, one or more: antennas, amplifiers, cables, analog-to-digital converters, filters, down-converters, processors, etc.

DETAILED DESCRIPTION

In some embodiments set forth herein, a generalized Unitary Braid Divisional Multiplexing system (gUBDM) includes a modified Orthogonal Frequency Divisional Multiplexing (OFDM) system. The modified OFDM system can include some components common to an unmodified OFDM system, but also includes a generalized version of an OFDM component (e.g., a subset of the functionality of the OFDM). The gUBDM system can be designed to implement (e.g., in hardware and/or software executed by or stored in hardware) a modified OFDM step during operation, to execute a paired operation including performing an inverse Fast Fourier Transform (iFFT) (or a Fast Fourier Transform FFT) of signals at a signal transmitter to generate transformed signals that are transmitted, and then performing a Fast Fourier Transform (FFT) (or an inverse Fourier Transform iFFT) on the transformed signals at a receiver to recover the signals. The modification includes generalizing the iFFT/FFT performed by the transmitter to an arbitrary transformation (represented by an arbitrary matrix, for example an arbitrary unitary matrix).

Embodiments of a gUBDM system, as described in further detail herein, and including embodiments with the above modification of an OFDM system, can impart exceptional security and efficiency in transmission of signal over wireless communication channels. Other benefits of embodiments of the gUBDM as described herein include an ability to use non-linear transformations, as well as a generalized implementation involving equiangular tight frame (ETF) transformations or nearly equiangular tight frame (NETF) transformations as an example. Standard OFDM doesn't allow for a generalization to ETF/NETF "overloading".

Generalizing to an arbitrary unitary as implemented in a gUBDM system as described herein can also have the effect of spreading the energy of each symbol or vector in a signal to be transmitted out across the different subcarriers. Spreading the energy of each symbol or vector in a signal to be transmitted can reduce the Peak-to-Average-Power-Ratio (PAPR) of the signal, and provide a degree of spreading (and, therefore, interference rejection) that is comparable to systems such as Direct Sequence Spread Spectrum (DSSS) systems. Spreading the energy of each symbol or vector in a signal to be transmitted can also provide an extra degree of freedom in multiplexing. In other words, in addition to standard frequency division multiplexing and time division multiplexing, a gUBDM system introduces code division multiplexing, which adds a powerful degree of freedom for multiplexing in a signal transmission system.

Figure 1:
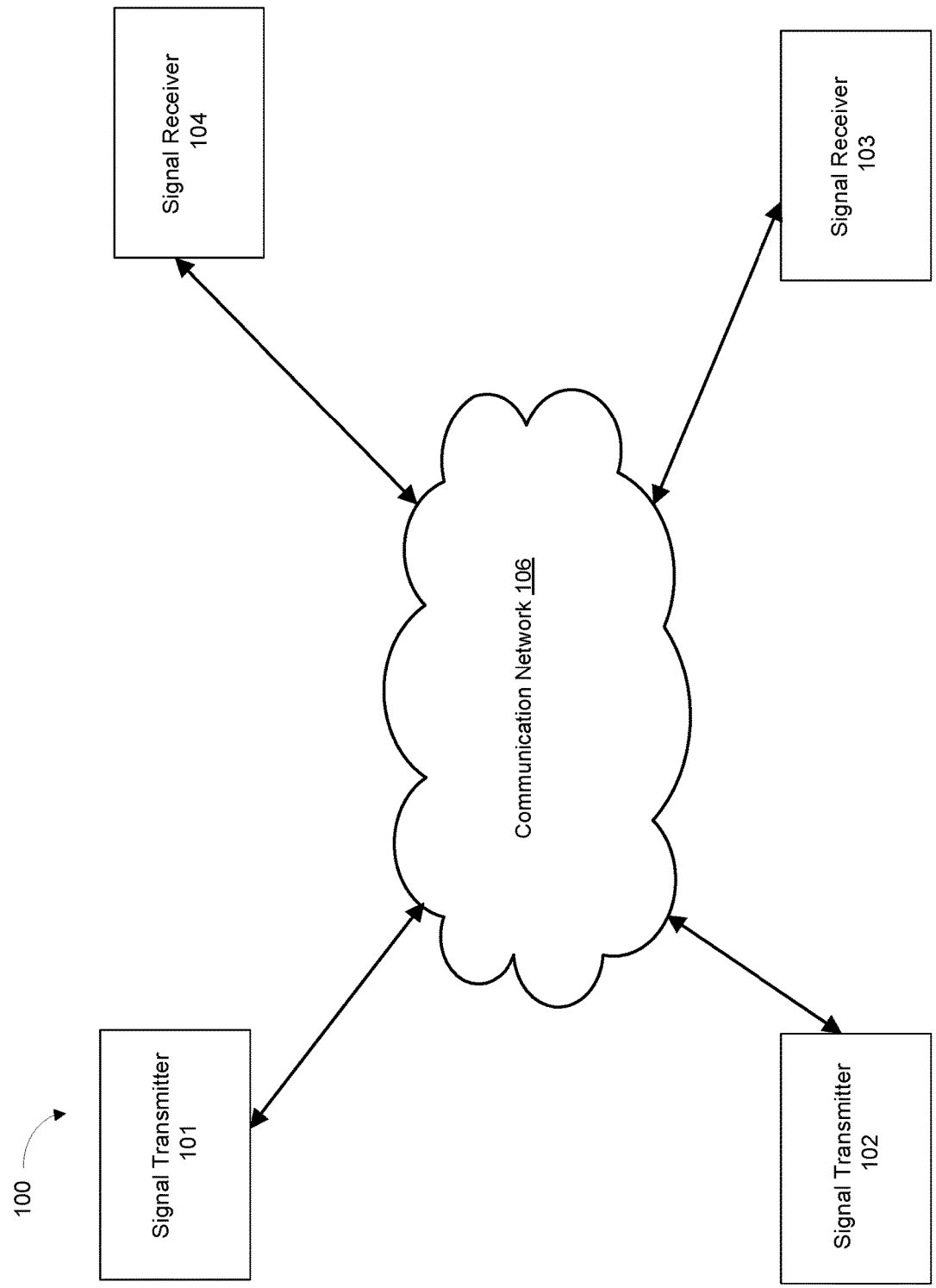
FIG. 1 is a schematic illustration of a secure and efficient generalized Unitary Braid Divisional Multiplexing (gUBDM) system, according to an embodiment.

FIG. 1 is a schematic illustration of a secure and efficient, generalized Unitary Braid Divisional Multiplexing system 100, also referred to herein as a "gUBDM system" or "a system," according to an embodiment. The gUBDM 100 is configured to send and/or receive wireless electronic communications in a secure and efficient manner. The gUBDM system 100 includes signal transmitters 101 and 102, signal receivers 103 and 104, and a communication network 106, as illustrated in FIG. 1. The gUBDM system 100 is configured to process and transmit a signal from the signal transmitters 101 and 102 via one or more communication channels defined via the communication network to the signal receivers 103 and 104. Given a signal to be transmitted from a signal transmitter 101 and/or 102 and to a signal receiver 103 and/or 104, the gUBDM system 100 is configured such that the signal transmitter 101 and/or 102 can process the signal by applying an arbitrary transformation to generate a transformed signal that is transmitted to the signal receivers 103 and/or 104. The arbitrary transformation can be applied using one or more of hardware, software, a field-programmable gate array (FPGA), etc. The signal transmitters 101 and/or 102 also send to the signal receivers 103 and/or 104 (e.g., before transmitting the signal) an indication of the arbitrary transformation that was applied. The signal receivers 103 and/or 104 are configured to receive the transformed signal and the indication of the arbitrary transformation applied by the signal transmitter(s) and apply an inverse of the arbitrary transformation to recover the signal from the transformed signal. While the system 100 is illustrated to include two signal transmitters 101 and 102, and two signal receivers 103 and 104, a similar gUBDM system can include any number of signal transmitters and/or signal receivers.

In some embodiments, the communication network 106 (also referred to as "the network") can be any suitable communications network that includes one or more communication channels configured for wirelessly transferring data, operating over public and/or private networks. Although not shown, in some implementations, the signal transmitters 101,102 and signal receivers 103,104 (or portions thereof) can be configured to operate within, for example, a data center (e.g., a cloud computing environment), a computer system, one or more server/host devices, and/or so forth. In some implementations, the signal transmitters 101,102 and signal receivers 103,104 can function within various types of network environments that can include one or more devices and/or one or more server devices. For example, the network 106 can be or can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), a Bluetooth® network, a virtual network, and/or any combination thereof. In some instances, the communication network 106 can be a wireless network such as, for example, a Wi-Fi or wireless local area network ("WLAN"), a wireless wide area network ("WWAN"), and/or a cellular network. The communication network 106 can be, or can include a wireless network and/or wireless network implemented using, for example, gateway devices, bridges, switches, and/or so forth. The network 106 can include one or more segments and/or can have portions based on various protocols such as Internet Protocol (IP) and/or a proprietary protocol. The communication network 106 can include at least a portion of the Internet. In some instances, the communication network 106 can include multiple networks or subnetworks operatively coupled to one another by, for example, network bridges, routers, switches, gateways and/or the like (not shown).

Figure 2:
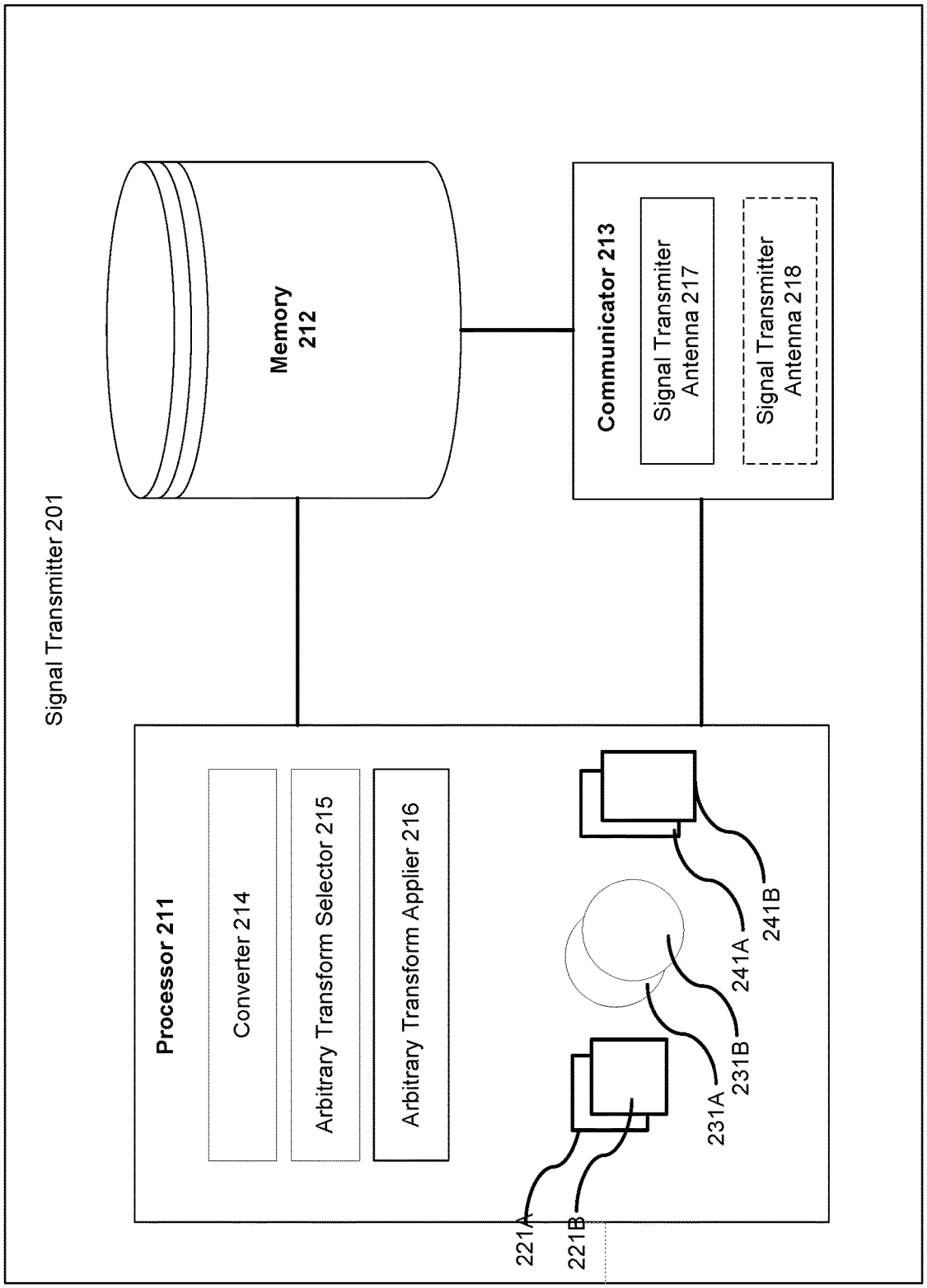
FIG. 2 is a schematic representation of a signal transmitter within a gUBDM system, according to an embodiment.

FIG. 2 is a schematic block diagram of an example signal transmitter 201 that can be a part of an gUBDM system such as the gUBDM system 100 described above with reference to FIG. 1, according to an embodiment. The signal transmitter 201 can be structurally and functionally similar to the signal transmitters 101,102 of the system 100 illustrated in FIG. 1. In some embodiments, the signal transmitter 201 can be, or can include, processors configured to process instructions stored in a memory The signal transmitter 201 can be a hardware-based computing device and/or a multimedia device, such as, for example, a server, a desktop compute device, a smartphone, a tablet, a wearable device, a laptop and/or the like. The signal transmitter 201 includes a processor 211, a memory 212 (e.g., including data storage), and a communicator 213.

The processor 211 can be, for example, a hardware based integrated circuit (IC) or any other suitable processing device configured to run and/or execute a set of instructions or code. For example, the processor 211 can be a general purpose processor, a central processing unit (CPU), an accelerated processing unit (APU), an application specific integrated circuit (ASIC), a digital signal processor (DSP), a field programmable gate array (FPGA), a programmable logic array (PLA), a complex programmable logic device (CPLD), a programmable logic controller (PLC) and/or the like. The processor 211 can be operatively coupled to the memory 212 through a system bus (for example, address bus, data bus and/or control bus).

The processor 211 can be configured to receive a signal to be transmitted and to perform processing to transform the signal into a transformed signal by applying an arbitrary transformation. In some implementations, the processor 211 can apply an arbitrary transformation that is defined to be a unitary transformation such that the transformed signal can be transmitted in a secure and efficient manner using the gUBDM system.

The processor 211 can include a set of components including a converter 214, an arbitrary transform selector 215, and an arbitrary transform applier 216. The processor 211 can receive a set of signals 221A, 221B, perform a set of arbitrary transformations 231A, 231B, and send a set of transformed signals 241A, 241B.

In some embodiments, each of the converter 214, an arbitrary transform selector 215, and an arbitrary transform applier 216 can be software stored in the memory 212 and executed by processor 211. For example, each of the above mentioned portions of the processor 211 can be code to cause the processor 211 to execute the converter 214, the arbitrary transform selector 215, and the arbitrary transform applier216. The code can be stored in the memory 212 and/or a hardware-based device such as, for example, an ASIC, an FPGA, a CPLD, a PLA, a PLC and/or the like. In other embodiments, each of the converter 214, the arbitrary transform selector 215, and the arbitrary transform applier 216 can be hardware configured to perform the respective functions. In some embodiments, each of the components can a combination of software and hardware based. In some embodiments one or more of the components (e.g., converter 214, the arbitrary transform selector 215, the arbitrary transform applier 216) of the processor 211 can be configured to operate based on one or more platforms (e.g., one or more similar or different platforms) that can include one or more types of hardware, software, firmware, operating systems, runtime libraries, and/or so forth. In some implementations, the components of the signal transmitter can be configured to operate within a cluster of devices (e.g., a server farm). In such an implementation, the functionality and processing of the components of the signal transmitter 201 can be distributed to several devices of the cluster of devices. The components of the signal transmitter 201 and signal receiver 301 can be, or can include, any type of hardware and/or software configured to process attributes (shown in FIG. 3).

The converter 214 can be configured to receive a signal to be transmitted and prepare the signal in a form that can be transformed by the processor 211 using an arbitrary transformation. For example, in some embodiments, the processor 211 can receive a signal in the form of a serial set of symbols $b_n$. The converter 214 can be configured to perform a serial-to-parallel computation on the set of symbols $b_n$ to convert the serial set of symbols $b_n$ to a parallel set of symbols. In some embodiments, the converter 214 can generate a plurality of vectors (e.g., vectors 221A and 221B) based on the set of symbols. In some implementations, the converter 214 can receive a signal in the form of a plurality of input bits. The converter 214 can be configured to generate a plurality of symbols based on the plurality of input bits. The converter 214 can be further configured to generate a plurality of blocks based on the plurality of symbols where each block from the plurality of blocks represents a vector from a plurality of vectors (e.g., vectors 221A, 221B). Alternatively, the converter 214 can be further configured to generate multiple pluralities of blocks based on the plurality of symbols where each plurality of blocks from the multiple pluralities of blocks represents a vector from a plurality of vectors (e.g., vectors 221A, 221B).

The arbitrary transform selector 215 can be configured to select, based at least partly on the signal to be transmitted or the plurality of vectors generated by the converter 214, an arbitrary transformation (e.g., arbitrary transformation 231A, 231B) to be applied on the plurality of vectors (e.g., vectors 221A, 221B) to securely and efficiently transmit the vectors from the signal transmitter 201 to one or more receivers associated with the gUBDM system. The arbitrary transformation (e.g., arbitrary transformation 231A, 231B) can include one of, or a combination of any of, a non-linear transformation, a unitary transformation, an ETF transformation, or a NETF transformation. In some embodiments, the arbitrary transform selector 215 can have access to a library of arbitrary transformations that are unitary by design (e.g., arbitrary transformation 231A, 231B) from which one can be selected for transmitting a signal. The arbitrary transform selector 215 can select the arbitrary transformation based, for example, on a transformation type and/or a criteria negotiated between two communicants via a telecommunications handshake or otherwise input by a participant in the communications system. The criteria can include, for example, one or more of: a desired security level, a latency threshold, an error rate threshold, a minimum data rate, a maximum data rate, etc. Notably, unitary transformation is the largest class of transformations that can be performed on a vector of symbols that leaves the total power of the signal unchanged. If a non-unitary transformation is used, then the inverse transformation at the receiver will necessarily amplify noise in some of the received symbols, whereas this is not the case of unitary transformations.

In some instances, the arbitrary transformation selector 215 can be configured to select a transformation that is not an identity matrix, a discrete Fourier matrix, or is any other direct sum of Fourier matrices. For example in some implementations the arbitrary transformations selector 215 can have a library of unitary transformations and based on a set of guidelines select one unitary transformation U and perform computations to check if U is an identity matrix, or a discrete Fourier matrix, or is any other direct sum of a set of Fourier matrices. If U is one of the three above categories, in some embodiments the arbitrary transform selector 215 can discard U and select another transformation that can meet the guideline of not being any of the above three categories. If the arbitrary transformation selector 215 picks a transformation U that is not an identity matrix, a discrete Fourier matrix, or is any other direct sum of Fourier matrices it can then assign U as the arbitrary transformation A to be used for an instance of transforming a signal to be transmitted using a gUBDM system according to that embodiment.

In some implementations, the arbitrary transform selector 215 can perform the selection based on a set of inputs received by the processor 211. In some implementations, the arbitrary transform selector 215 can perform the selection based on a set of parameters associated with the signal, the plurality of vectors, the nature of signal transmission (e.g., a security requirement, sensitivity of information content in the signal, path of signal transmission, etc.). In some implementations, the arbitrary transform selector 215 can be configured to define and generate an arbitrary transformation according to a set of inputs received by the processor 211 (e.g., a set of user inputs received by the processor 211).

The arbitrary transform applier 216 can apply the selected arbitrary transformation on the plurality of vectors (e.g., vectors 221A, 221B) to generate a plurality of transformed vectors (e.g., transformed vectors 2411A, 241B). In some implementations, the plurality of transformed vectors can have a total magnitude that substantially equals a total magnitude of the plurality of vectors.

The transformed vectors can then be sent to the signal transmitter antennas 217 and 218 included in the communicator 213 to be sent to one or more signal receivers associated with a signal receiver. In some implementations, for example, the arbitrary transform applier 216 can be configured to perform matrix operations to apply a transformation matrix A on a set of vectors to generate transformed vectors. In some implementations, the arbitrary transform applier 216 can be configured to perform any suitable number of procedures (e.g. signal processing procedures, suitable matrix operations) on a set of vectors before applying an arbitrary transformation.

While illustrated to include two signal transmitter antennas 217 and 218, as described above, a similar signal transmitter could include a single transmitter antenna according to some embodiments. A similar signal transmitter could include any suitable higher number of signal transmitter antennas (i.e., more than two transmitter antennas) according to still other embodiments. In some embodiments the signal transmitter 201 can include a plurality of antenna arrays configured to perform Multiple Input Multiple Output (MIMO) operations.

The memory 212 of the signal transmitter 201 can be, for example, a random access memory (RAM), a memory buffer, a hard drive, a read-only memory (ROM), an erasable programmable read-only memory (EPROM), and/or the like. The memory 212 can store, for example, one or more software modules and/or code that can include instructions to cause the processor 211 to perform one or more processes, functions, and/or the like (e.g., functions associated with the converter 214, the arbitrary transform selector 215, the arbitrary transform applier 216). In some embodiments, the memory 212 can include extendable storage units that can be added and used incrementally. In some implementations, the memory 212 can be a portable memory (for example, a flash drive, a portable hard disk, and/or the like) that can be operatively coupled to the processor 211. In other instances, a memory can be remotely operatively coupled with the signal transmitter 201. For example, a remote database server can serve as a memory and be operatively coupled to the signal transmitter 201.

The communicator 213 can be a hardware device operatively coupled to the processor 211 and memory 212 and/or software stored in the memory 212 executed by the processor 211. The communicator 213 can include a signal transmitter antenna 217 and optionally a signal transmitter antenna 218. While a second transmitter antenna 218 in addition to the transmitter 217 is shown in FIG. 2, a signal transmitter similar to the signal transmitter 201 can have any number of transmitter antennas, according to some embodiments, or just a single signal transmitter antenna, according to some other embodiments. The communicator 213 can be, for example, a network interface card (NIC), a Wi-Fi™ module, a Bluetooth® module and/or any other suitable wired and/or wireless communication device. Furthermore the communicator 213 can include a switch, a router, a hub and/or any other network device. The communicator 213 can be configured to connect the compute device 201 to a communication network (such as the communication network 106 shown in FIG. 1). In some instances, the communicator 213 can be configured to connect, via one or more communication channels, to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 213 can facilitate receiving and/or transmitting a file and/or a set of files via one or more communication channels through a communication network (e.g., the communication network 106 in the gUBDM system 100 of FIG. 1). In some instances, a received file can be processed by the processor 211 and/or stored in the memory 212 as described in further detail herein. In some instances, as described previously, the communicator 213 can be configured to send a plurality of transformed vectors, via the signal transmitter antennas 217 and 218, to one or more signal receiver antennas associated with one or more signal receivers connected to a communication network as part of a gUBDM system. The communicator 213 can also be configured to send and/or receive data associated with a library of arbitrary transformation systems.

Figure 3:
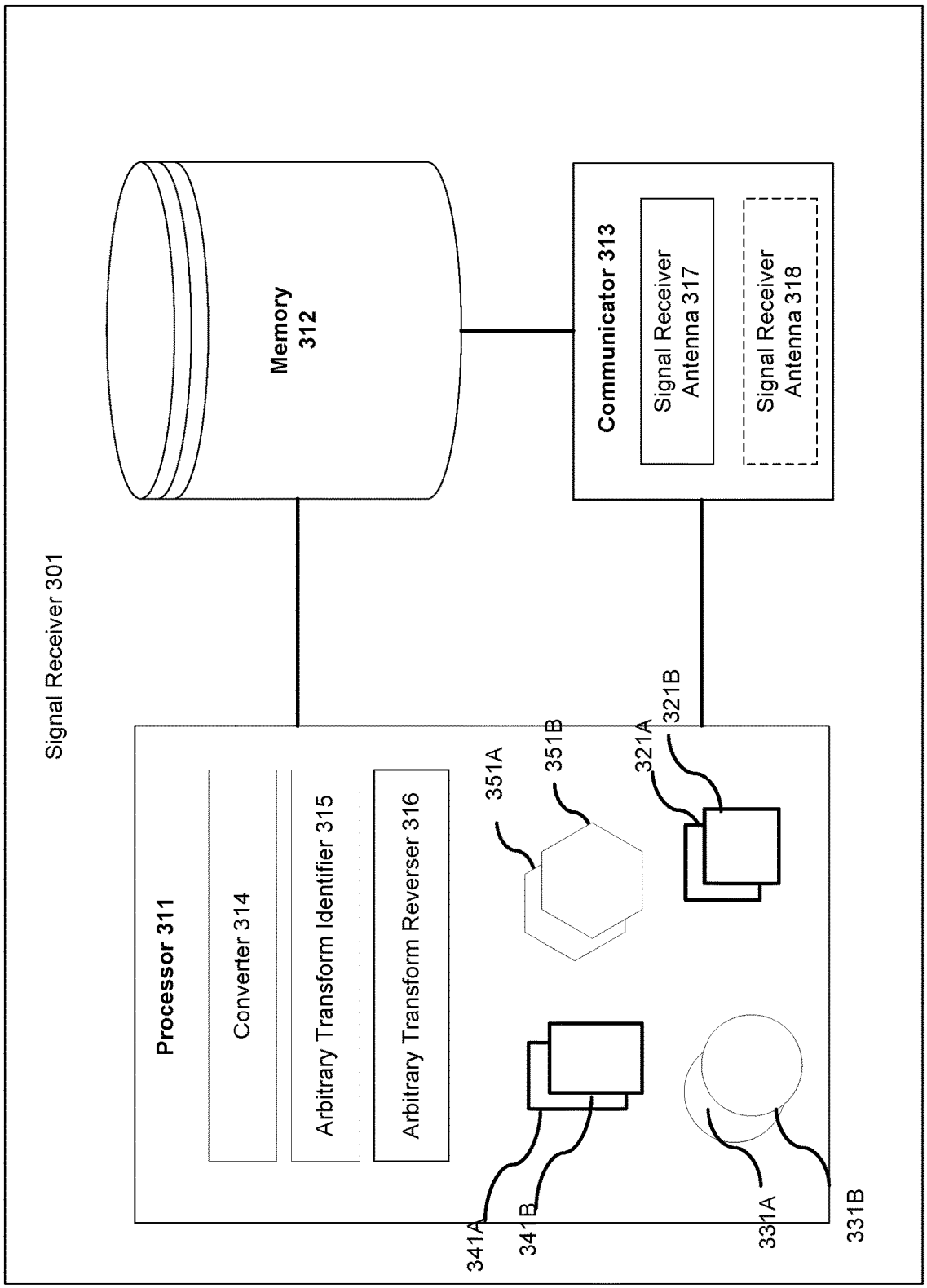
FIG. 3 is a schematic representation of a signal receiver within a gUBDM system, according to an embodiment

Returning to FIG. 1, the signal transmitters 101,102 that are connected to gUBDM system 100 can be configured to communicate with and transmit signals to signal receivers 103, 104 via one or more communication channels defined in the communication network 106. FIG. 3 is a schematic representation of a signal receiver 301 that is part of gUBDM system. The signal receiver 301 can be structurally and functionally similar to the signal receivers 103, 104 of the system 100 illustrated in FIG. 1. The signal receiver 301 includes a processor 311, a memory 312, and a communicator 313.

The processor 311 can be, for example, a hardware based integrated circuit (IC) or any other suitable processing device configured to run and/or execute a set of instructions or code. For example, the processor 311 can be a general purpose processor, a central processing unit (CPU), an accelerated processing unit (APU), an application specific integrated circuit (ASIC), a digital signal processor (DSP), a field programmable gate array (FPGA), a programmable logic array (PLA), a complex programmable logic device (CPLD), a programmable logic controller (PLC) and/or the like. The processor 311 can be operatively coupled to the memory 312 through a system bus (for example, address bus, data bus and/or control bus).

The processor 311 can be configured to receive a transformed signal that is securely transmitted via one or more communication channels defined in a communication network (e.g., network 106 of FIG. 1), obtain information associated with an arbitrary transformation that was used to generate the transformed signal, and based on the information process the transformed signal to recover an original signal (e.g., by applying an inverse of the arbitrary transformation) such that the original signal can be received by a destination in a secure and efficient manner using the gUBDM system, according to an embodiment.

The processor 311 can include a set of components including a converter 314, an arbitrary transform identifier 315, and an arbitrary transform reverser 316. The processor 311 can include, or access from memory 312, a plurality of transformed vectors 341A, 341B, representing transformed signals, received from one or more transmitter antennas of a signal transmitter (e.g., transmitter antennas 217 and 218 of signal transmitter 201) that is part of the gUBDM system that the signal receiver 301 is part of. The processor 311 can include or access in memory 312 a set of arbitrary transformations 331A and 331B, identified based on information associated with a signal received from a signal transmitter, and a set of reverse transformations 351A, 351B, computed based on the identified arbitrary transformations, and a plurality of vectors 321A, 321B representing a set of original signals.

The arbitrary transform identifier 315 can be configured to receive information associated with a transformed signal (e.g., transformed signal represented by transformed vectors 341A, 341B) received via the signal receivers 317 and 318, the information including an indication of the identity of an arbitrary transformation that was used in generating the transformed signals. The arbitrary transform identifier 315 is configured to, based on the information, identify the arbitrary transformation that can be used to recover an original signal (e.g., original signal represented by plurality of vectors 321A, 321B) from the transformed signal (e.g., transformed signals 341A, 341B).

The arbitrary transform reverser 316 generates, based on the identity of the arbitrary transformation, an inverse of the identified arbitrary transformation, also referred to as a reverse transformation (e.g., reverse transformations 351A, 351B) configured to reverse the effects of the identified arbitrary transformation to recover the original signal from a transformed signal. For example, in some embodiments, the arbitrary transform reverser 316 generates a reverse transformation (A') 351A configured to be applied on a plurality of transformed vectors 341A and 341B, representing a transformed signal, and received by the signal receiver 301, so that the reverse transformation (A') 351A can reverse the effects of an arbitrary transformation (A) 331A and recover a plurality of vectors 321A and 321B representing an original signal.

The converter 314 can be configured to receive a recovered plurality of vectors (e.g., 321A and 321B) representing an original signal and regenerate the original signal from the recovered plurality of vectors. For example, in some embodiments, the processor can receive a parallel set of symbols $b_n$. The converter 314 can be configured to perform a parallel-to-serial computation on the set of symbols $b_n$ to convert the parallel set of symbols $b_n$ to a serial set of symbols that can be similar to the original signal. In some embodiments, the converter 314 can receive a plurality of recovered vectors (e.g., vectors 321A and 321B) and generate, based on the vectors, an original signal including a set of symbols. In some embodiments, the converter 314 can receive a plurality of recovered vectors (e.g., vectors 321A and 321B) and generate, based on the recovered vectors pluralities of blocks each plurality of blocks representing a vector of the plurality of vectors. The converter 314 can then regenerate, based on the pluralities of blocks, a plurality of input bits from which it can recover an original signal.

The memory 312 of the signal receiver 301 can be similar in structure and/or function to the memory 212 of the signal transmitter 201. For example, the memory 312 can be a random access memory (RAM), a memory buffer, a hard drive, a read-only memory (ROM), an erasable programmable read-only memory (EPROM), and/or the like. The memory 312 can store, for example, one or more software modules and/or code that can include instructions to cause the processor 311 to perform one or more processes, functions, and/or the like (e.g., functions associated with the converter 314, the arbitrary transform identifier 315, the arbitrary transform reverser 316). In some embodiments, memory 312 can include extendable storage units that can be added and used incrementally. In some implementations, the memory 312 can be a portable memory (for example, a flash drive, a portable hard disk, and/or the like) that can be operatively coupled to the processor 311. In other instances, the memory can be remotely operatively coupled with the signal receiver 301. For example, a remote database server can serve as a memory and be operatively coupled to the signal receiver 301.

The communicator 313 can be a hardware device operatively coupled to the processor 311 and memory 312 and/or software stored in the memory 312 executed by the processor 311. The communicator 313 can include a signal receiver antenna 317 and optionally a signal receiver antenna 318. While a second receiver 318 in addition to the receiver 317 is shown in FIG. 3, a signal receiver similar to the signal receiver 301 can have any number of receivers, according to some embodiments, or just a single signal receiver, according to some other embodiments. The communicator 313 can be, for example, a network interface card (NIC), a Wi-Fi™ module, a Bluetooth® module and/or any other suitable wired and/or wireless communication device. Furthermore the communicator 313 can include a switch, a router, a hub and/or any other network device. The communicator 313 can be configured to connect the signal receiver 301 to a communication network (such as the communication network 106 shown in FIG. 1). In some instances, the communicator 313 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 313 can facilitate receiving and/or transmitting a file and/or a set of files via one or more communication channels defined in a communication network (e.g., the communication network 106 in the gUBDM system 100 of FIG. 1). In some instances, a received file can be processed by the processor 311 and/or stored in the memory 312 as described in further detail herein. In some instances, as described previously, the communicator 313 can be configured such that the signal receivers 317 and 318 include one or more antennas tuned to receive transformed signals of a particular predetermined center frequency within a predetermined bandwidth, to receive transformed signals securely and efficiently transmitted by one or more signal transmitter antennas associated with one or more signal transmitters connected to a communication network as part of a gUBDM system. The communicator 313 can also be configured to send and/or receive data associated with a library of arbitrary transformation systems. In some embodiments the signal receiver 301 can include a plurality of antenna arrays configured to perform Multiple Input Multiple Output (MIMO) operations.

Figure 4A:
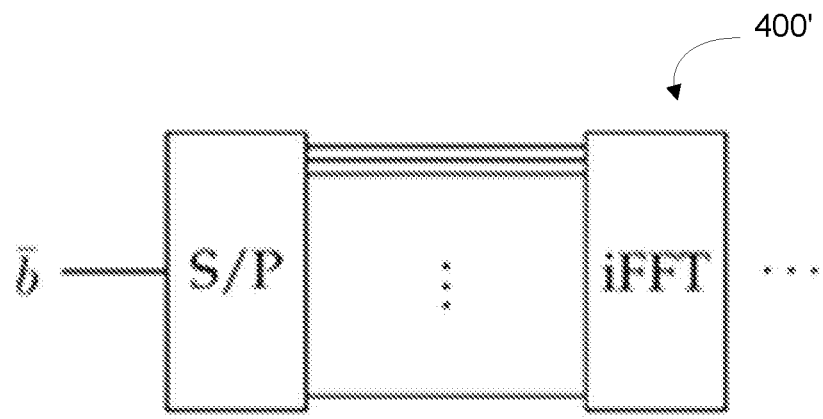
FIG. 4A is a schematic representation of a processing of a signal at a signal transmitter of an OFDM system.

In some embodiments, the gUBDM system (e.g., gUBDM system 100) can be in some aspects partly similar in structure and/or function to an Orthogonal Frequency Divisional Multiplexing (OFDM) system. For example, an example pipeline for an OFDM system 400' can include a set of operations as presented in FIG. 4A, where vector b can be a set of symbols $b_n$.

In the example OFDM system 400', the symbols $b_n$ enter an OFDM transmitter and are first put through a "serial-to-parallel" (labeled "S/P" above) computation, and then they are run through an inverse FFT (labeled "iFFT" above). In some embodiments, they may be given a cyclic prefix, and undergo a pulse shaping procedure. An OFDM receiver can be configured to perform the above operations in a reverse order, except an FFT replaces the iFFT.

Figure 4B:
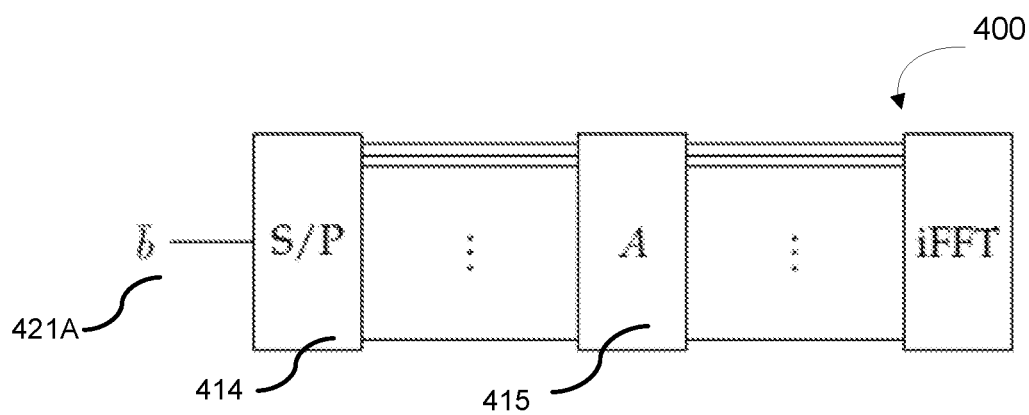
FIG. 4B is a schematic representation of a processing of a signal at a signal transmitter of a gUBDM system, according to an embodiment.

Compared to the above described OFDM system 400', operations carried out by a gUBDM system 400 described herein (e.g., gUBDM system 100) are illustrated in FIG. 4B. The gUBDM 400 can include an extra operator (e.g., a linear operator) A between the S/P block 414 and the iFFT block, as shown in FIG. 4B. In use, according to the example embodiment associated with FIG. 4B, the gUBDM 400 operates such that symbols $b_n$ are received by the signal transmitter and are first put through a serial-to-parallel block (e.g., converter similar to converter 214 of the signal transmitter 201) to generate a converted set of vectors. The converted set of vectors then undergo the linear transformation A to generate a set of transformed vectors. For example, the transformation can be carried out by an arbitrary transformation applier 415 similar to arbitrary transformation applier 216 and the linear transformation A being selected by arbitrary transformation selector similar to the arbitrary transformation selector 215. In some embodiments, the transformed vectors are then put through an iFFT block to generate a second transformed vectors and the resulting second transformed vectors can be transmitted to one or more receivers in the gUBDM system. In some other embodiments, the iFFT block can be skipped and the transformed vectors generated by the arbitrary transformation applier can be transmitted to one or more receivers in the gUBDM system. Expressed in another way, $$\bar{b} \to A\bar{b} \to s = FA\bar{b}.$$

Figure 4C:
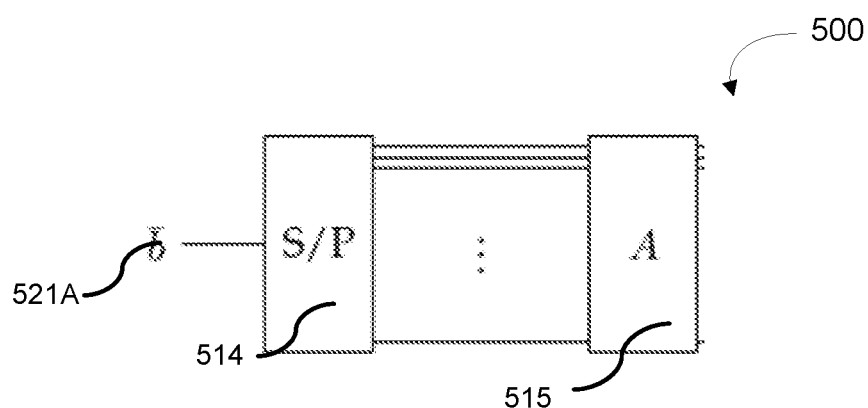
FIG. 4C is a schematic representation of a processing of a signal at a signal transmitter of a gUBDM system, according to an embodiment

(where F is the discrete Fourier matrix). In some embodiments, A can be unitary by design, as described herein, and F is known to be unitary. By property of unitary matrices as a group, the product FA will also be unitary. Therefore, because A can be any unitary, including the iFFT matrix is unnecessary, and according to some embodiments a gUBDM system can be configured by replacing the iFFT block with an arbitrary unitary A, as illustrated in FIG. 4C showing the operations in a gUBDM system 500, including an arbitrary transform applier 515, according to an embodiment.

Following the above description a signal transmitter and a signal receiver operable with an OFDM system (e.g., OFDM system 400 of FIG. 4A) can be easily adapted to be used with a gUBDM system described herein (e.g., gUBDM systems 400 and 500 in FIGS. 4B and 4C) with the only changes being a replacement of an iFFT operation with an arbitrary transformation operation using A at the transmitter and the FFT with A' at the signal receiver to reverse the transformation. Other details of an OFDM system can remain.

The above described gUBDM system, in use, can be used to transmit signal in a highly secure and efficient manner as described in detail below. Given a signal transmission system, where one or more signals are transmitted from a source associated with a user Alice to a destination associated with a user Bob, such a system may be vulnerable to eavesdropping by a third party user Eve who may have access to the transmitted signal or transmitted vectors. Given that a gUBDM system is being used for the signal transmission, where an arbitrary transformation A is used to generate the transformed signal or transformed vectors that are being transmitted, if Eve doesn't know the matrix A and is only able to base her attack on knowing cipher, the amount of work she has to do to recover the data can be prohibitively large. In some other embodiments, the arbitrary transformation can be non-linear in nature, making it even more complicated and infeasible for Eve to find the non-linear transformation to recover signals even if she has access to plaintext/ciphertext pairs.

Figure 5:
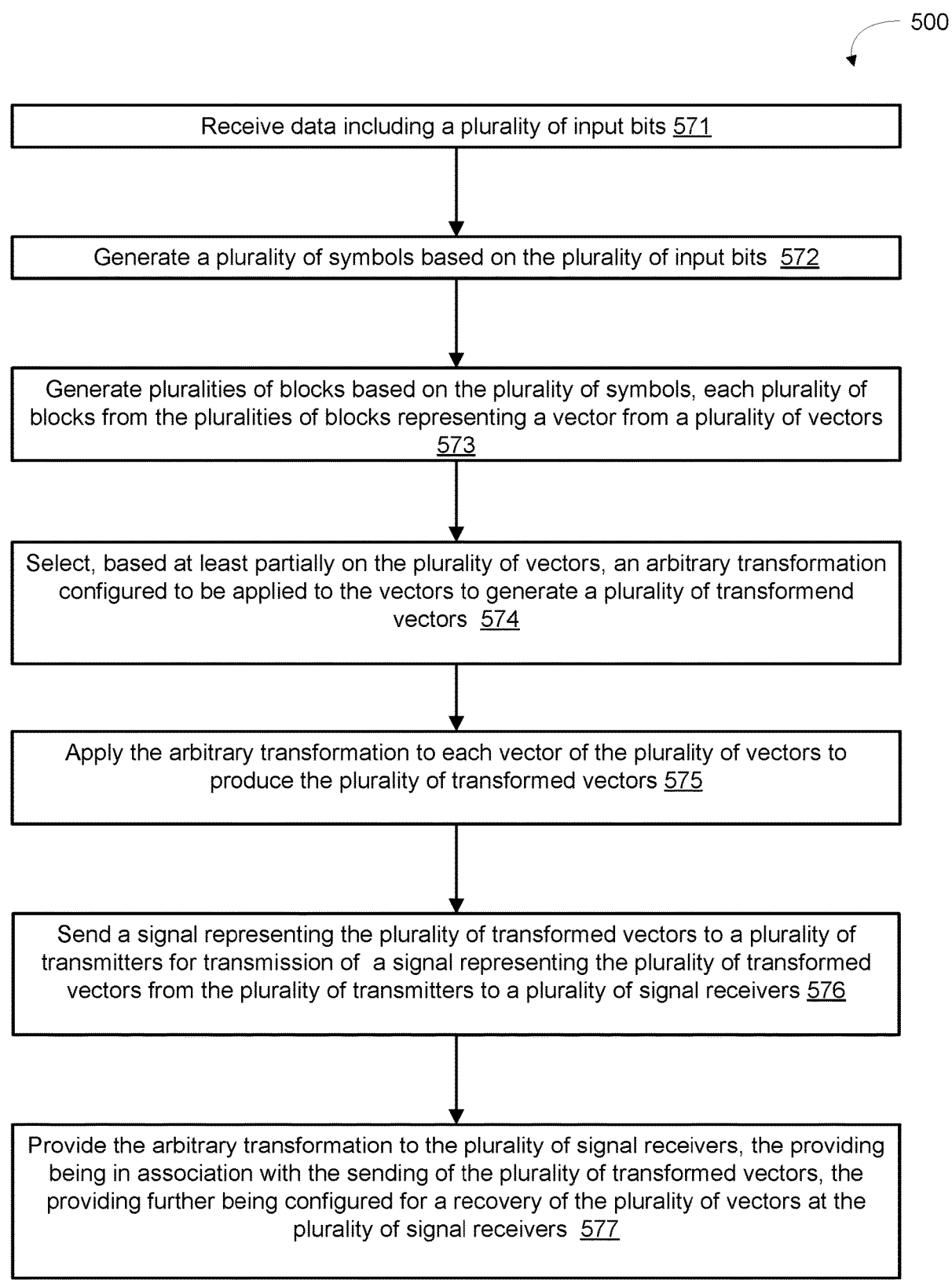
FIG. 5 is a flowchart describing a method of processing and transmitting a signal using a gUBDM system, according to an embodiment.

FIG. 5 illustrates a flowchart describing an example method 500 of preparing a signal and transmitting a signal in a secure and efficient manner using a gUBDM system, according to an embodiment. At 571, according to the method 500, a signal transmitter of a gUBDM system (e.g., the signal transmitter 201 described above) receives data including a plurality of input bits. The plurality of input bits can represent an original signal that is to be transmitted in a secure and efficient manner. The data can further include other attributes associated with the signal represented by the input bits. For example the data can include information related to the nature of the signal, the nature of the input bits, the size, sensitivity of the information contained, security requirement, etc.

At 572, the signal transmitter generates a plurality of symbols based on the plurality of input bits. In some instances, the signal transmitter can generate a plurality of symbols with a symbol being described as a pulse in a digital complex baseband signal. In some implementations, a symbol can be a waveform, or a state that, when transmitted through a communication channel defined in a communications network, can change/alter and/or maintain a state or a significant condition of the communication channel such that the state or condition persists, for a fixed period of time. In some instances, a signal transmitter can break up a plurality of input bits associated with a serial signal into a plurality of symbols that can be modified and/or transmitted in parallel using a Multiple Input and Multiple Output system of transmission as described further below. In some instances, a signal transmitter can use a converter (e.g., converter 214) to convert a serial plurality of input bits into a parallel plurality of symbols. In some implementations, the generating a plurality of symbols based on a plurality of input bits can be via using a bit-to-symbol map.

At 573, the signal transmitter generates pluralities of blocks based on the plurality of symbols, each plurality of blocks from the pluralities of blocks representing a vector from a plurality of vectors. In some instances, a signal transmitter can receive a serial plurality of symbols associated with a serial signal and break it up into pluralities of blocks each plurality of block representing a vector from a plurality of vectors, the vectors being configured to be transformed and/or transmitted in parallel using a Multiple Input and Multiple Output system of transmission as described herein. In some instances, a signal transmitter can use a converter (e.g., converter 214) to convert the serial plurality of symbols into the pluralities of blocks.

At 574, the signal transmitter select, based at least partially on the plurality of vectors, an arbitrary transformation configured to be applied to the vectors to generate a plurality of transformed vectors. For example, the signal transmitter can have access to a library of arbitrary Transformations including unitary transformations, equiangular tight frame (ETF) transformations, and a nearly equiangular tight frame (NETF) transformations. The signal transmitter can use an arbitrary transformation selector (e.g., arbitrary transformation selector 215) to select arbitrary transformation, for example a unitary transformation, to be applied on the plurality of vectors to generate a plurality of transformed vectors. In some instances, the arbitrary transformation can select an equiangular tight frame (ETF) transformation, or in some other instances the arbitrary transformation selector can select a nearly equiangular tight frame (NETF) transformation. In some implementations, the arbitrary transformation selector can be configured such that the arbitrary transformation selected is based on a matrix that is not an identity matrix or a discrete Fourier matrix. In some implementations, the arbitrary transformation selector can be configured such that the arbitrary transformation selected is based on a matrix that is not a direct sum of discrete Fourier matrices.

At 575, the signal transmitter applies the arbitrary transformation to each vector of the plurality of vectors to produce the plurality of transformed vectors. In some instances, the applying the arbitrary transformation can be such that the plurality of transformed vectors has a total magnitude that substantially equals a total magnitude of the plurality of vectors.

At 576, the signal transmitter sends a signal representing the plurality of transformed vectors to a plurality of transmitter antennas for transmission of a signal representing the plurality of transformed vectors from the plurality of transmitter antennas to a plurality of signal receivers. In some instances, the plurality of transformed vectors can be configured to be sent in parallel via multiple transmitter antennas associated with the signal transmitter antenna device (e.g., transmitter antennas 217 and 218 associated with the signal transmitter 201) and through multiple communication channels using a Multiple Input and Multiple Output system of transmission such that the transformed vectors sent in parallel can be received by a plurality of receivers associated with one or more signal receivers associated with the gUBDM system being used. For example, the plurality of signal receivers can include a plurality of antenna arrays, and the plurality of signal receivers be associated with signal receivers such as the signal receiver 301 and the plurality of signal transmitter antennas can be associated with signal transmitters such as the signal transmitter 201, where in the signal transmitter and the signal receiver are configured to perform Multiple Input Multiple Output (MIMO) operations.

In some implementations, the signal can include a set of transformed symbols associated with the plurality of transformed vectors and a signal transmitter (e.g., signal transmitter 201) can place a set of transformed symbols on the communication channel (s) (e.g., via a transmitter 217) at a fixed and known symbol rate. A signal receiver can perform the task of detecting the sequence of transformed symbols to reconstruct the transformed vectors. In some instances, there may be a direct correspondence between a transformed symbol and a small unit of data. For example, each transformed symbol may encode one or several binary digits or 'bits'. The data may also be represented by the transitions between transformed symbols, or even by a sequence of many transformed symbols.

In some implementations, the signal transmitter can be configured to send the signal representing the plurality of transformed vectors to the plurality of transmitters via a physical layer associated with an open system interconnection model (OSI). The OSI model is a conceptual model that characterizes and standardizes the communication functions of a telecommunication or computing system without regard to its underlying internal structure and technology with the goal of achieving interoperability of diverse communication systems using standard communication protocols. The OSI model uses partitioning of information exchanged via communication channels of a communication network into abstraction layers (e.g., seven layers) with each layer including information of a specific type.

For example, a layer 1 can include a physical layer used for the transmission and reception of unstructured raw data between a signal transmitter and a physical transmission medium (e.g., a wireless communication channel in a communication network such as network 106). It is configured to convert digital bits included in the signals transmitted into electrical, radio, or optical signals. Layer specifications define characteristics such as voltage levels, the timing of voltage changes, physical data rates, maximum transmission distances, modulation scheme, channel access method and physical connectors. This includes the layout of pins, voltages, line impedance, cable specifications, signal timing and frequency for wireless devices. Bit rate control is done at the physical layer and may define transmission mode as simplex, half duplex, and full duplex. The components of a physical layer can be described in terms of a network topology. The communications channel used to transmit the signal can have specifications for a physical layer.

At 577, the signal transmitter provides the arbitrary transformation to the plurality of signal receivers, the providing being in association with the sending of the plurality of transformed vectors, the providing further being configured for a recovery of the plurality of vectors at the plurality of signal receivers. In some implementations, the plurality of signal receivers is further configured to transmit a signal representing the plurality of transformed vectors to a target device. For example the plurality of signal receivers can be associated with one or more signal receivers that can be configured to transmit a signal representing the plurality of transformed vectors to a target device.

In some instances, the signal transmitter can send a signal that, in addition to representing the plurality of transformed vectors, can also be representing one of: (1) the arbitrary transformation, or (2) an inverse of the arbitrary transformation to the plurality of signal receivers. In some instances, the signal transmitter can send a first signal representing the plurality of transformed vectors and send a second signal representing the arbitrary transformation or an inverse of the arbitrary transformation. In some implementations the signal transmitter can send the second signal at a time point prior to the sending of the first signal. That is, said in another way, the signal transmitter can send the signal representing the arbitrary transformation or an inverse of the arbitrary Transformation prior to transmission of the signal representing the plurality of transformed vectors to the plurality of signal receivers, such that the plurality of signal receivers recovers the plurality of vectors from the plurality of transformed vectors based on the arbitrary transformation or an inverse of the arbitrary transformation.

Figure 6:
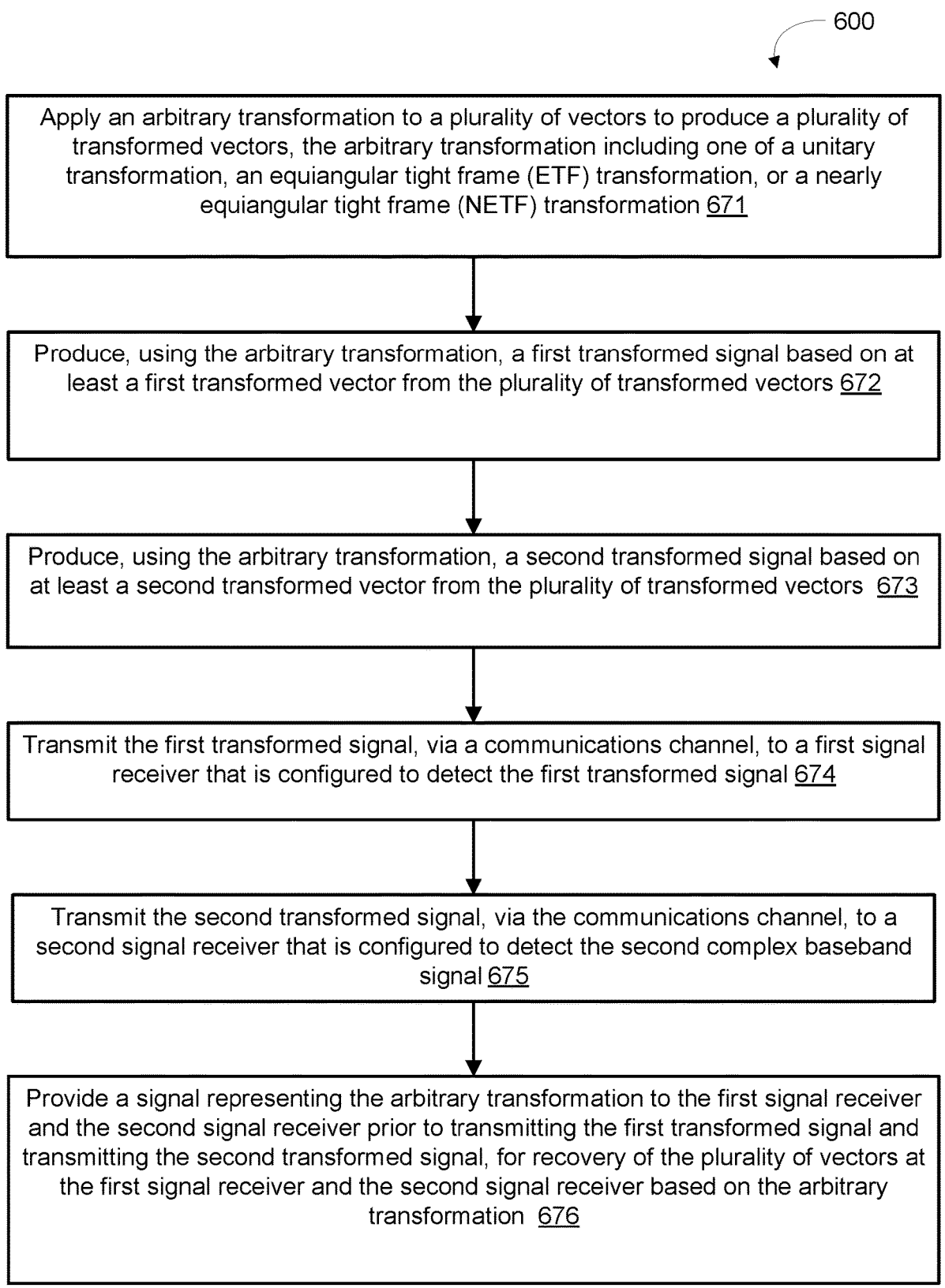
FIG. 6 is a flowchart describing a method of processing and transmitting a signal using a gUBDM system, according to an embodiment

FIG. 6 illustrates an example method 600 of transmitting a signal in a secure and efficient manner, using a gUBDM system according to an embodiment. The method 600 can be implemented by a processor for example a processor associated with a signal transmitter of a gUBDM system (e.g., the signal transmitter 201 described above). At 671, an arbitrary transformation is applied to a plurality of vectors to produce a plurality of transformed vectors. The arbitrary transformation can include a unitary transformation, an equiangular tight frame (ETF) transformation, or a nearly equiangular tight frame (NETF) transformation. In some implementations, more than one arbitrary transformations can be applied. For example in some instances, the signal transmitter implementing the method 600 can be configured such that a first arbitrary transformation is applied to the plurality of vectors to produce a first plurality of transformed vectors and a second arbitrary transformation is applied to the plurality of vectors to produce a second plurality of transformed vectors.

At 672, the method includes producing, using the arbitrary transformation, a first transformed signal based on at least a first transformed vector from the plurality of transformed vectors. In some instances the first transformed signal can include a first complex baseband signal. At 673, the method includes producing, using the arbitrary transformation, a second transformed signal based on at least a second transformed vector from the plurality of transformed vectors. In some instances, the second transformed signal can include a second complex baseband signal.

As described above, in some implementations the second transformed signal can be based on a second transformed vector the second plurality of transformed vectors generated using the second arbitrary transformation.

At 674, the method 600 includes transmitting the first transformed signal, via a communications channel, to a first signal receiver that is configured to detect the first transformed signal. At 675, the method includes transmitting the second transformed signal, via the communications channel, to a second signal receiver that is configured to detect the second complex baseband signal. In some instances, the transmitting the second transformed signal is via a second communications channel different from the first communications channel.

At 676, the method includes providing a signal representing the arbitrary transformation to the first signal receiver and the second signal receiver in association with the transmitting the first transformed signal and the transmitting the second transformed signal, for recovery of the plurality of vectors at the first signal receiver and the second signal receiver based on the arbitrary transformation. In some instances, the providing the signal representing the arbitrary transformation is done prior to transmitting the first transformed signal and the transmitting the second transformed signal. In some other instances, the providing the signal representing the arbitrary transformation can be done after the transmitting the first transformed signal and the transmitting the second transformed signal, in which case the signal receivers can store the transformed signal(s) received and recover the original signals at a later point in time after receiving the signal representing the arbitrary transformation. In some instances, the signal receivers can be configured to transmit a transformed signal to a target device. For example, the signal receivers can be configured to transmit a signal representing the plurality of transformed vectors to a designated target device.

As described above, in some instances where a first arbitrary transformation is used to produce the first plurality of transformed vectors and a second arbitrary transformation is used to the second plurality of transformed vectors, the providing a signal representing the arbitrary transformation can include providing a first signal representing the first arbitrary transformation and providing a second signal representing the second arbitrary transformation. In some implementations, the transmitting the first transformed signal and the providing the first signal representing the first arbitrary transformation can be to a first receiver associated with a first receiver, and the transmitting the second transformed signal produced using the second arbitrary transformation and the providing the second signal representing the second arbitrary transformation can be to a second receiver antenna associated with a second receiver different from the first receiver. In some instances, the first and second signals representing the first and second arbitrary transformations can be broadcast together to a wide audience including the first and second signal receivers. In some instances the first signal representing the arbitrary transformation can be broadcast widely but not the second signal representing the arbitrary transformation, such that the first signal receiver is able to recover the first plurality of vectors but the second receiver is unable to recover the second plurality of transformed vectors until the second signal representing the second arbitrary transformation is provided or broadcast.

While described as a variation of an OFDM system, some embodiments of a gUBDM system operate as a variation of a DSSS system wherein a "code map" is used and is bandwidth limited. The explicit form, as given in the '839 patent referred to above, is $$\bar{c}: \mathbb{C}^N \to \mathbb{C}^M \quad (33)$$
$$\bar{v} \mapsto \bar{c}(\bar{v}),$$

where the $m^{th}$ component of $\bar{c}(\bar{v}) \in \mathbb{C}^M$ is given by $$[\bar{c}(\bar{v})]_m = \sum_{n=1}^{N} v_n e^{-2\pi i \kappa_n (\frac{m}{M} - \frac{1}{2})}. \quad (34)$$

Here, $v_n$ is the $n^{th}$ component of $\bar{v}$, the $\kappa$s are a set of N distinct numbers satisfying $$\kappa_n - \kappa_m \in \mathbb{Z} \,\forall m, n, \quad (35)$$

and M is an integer chosen so that $M > 2\,\max_n |\kappa_n|$. This map has the properties discussed above (band-limited and dot-product preserving). Typically, $M \approx N$ if the $\kappa$ are sequential integers centered around 0.

So, to create a maximal set of mutually orthogonal spreading codes, a unitary matrix $A \in U(N)$ is chosen. If the $n^{th}$ column is denoted (or row, doesn't matter which as long as there is consistency) of A as $\bar{A}_n$, then the N codes are $\bar{c}(\bar{A}_n)$ for $n \in [1, \ldots, N]$.

If one device is to transmit data on all N codes, then it will be able to take the N symbols $b_n$, multiply each one by every component of its spreading code, and then add the resulting vectors together. So the transmitted vector $\bar{s}$ is $$\bar{s} = \sum_{n=1}^{N} b_n \bar{c}(\bar{A}_n), \quad (36)$$

where $b_n$ are the symbols.

But to do this, the transmitter multiplies a symbol $b\_n \in \mathbb{C}$ which is typically a complex number (a float, double, etc), times all $M \approx N$ components of $\bar{c}(\bar{A}\_n)$. This is repeated for all N symbols $b\_n$. So, there are N symbols, each being multiplied by N components of the code. This makes the complexity $O(\llbracket N \rrbracket^{\wedge} 2)$, which is prohibitive for wide-band applications. (Compare to OFDM, which is $O(N \log N)$.)

Notably for multiple access applications, where each user is given a subset of the codes, they only have to do $O(N)$ work, which is better than OFDM. That makes the DSSS implementation very good for multiple access applications.

To obtain a UBDM that is $O(N \log N)$, to match OFDM reinterpret (0.0.4). The transmitted baud is $$[\bar{s}]_m = \sum_{n=1}^{N} b_n [\bar{c}(\bar{A}_n)]_m \quad (37)$$

-continued $$= \sum_{n=1}^{N} b_n \sum_{k=1}^{N} A_{nk} e^{-2\pi i \kappa_k (\frac{m}{M} - \frac{1}{2})}$$

$$= \sum_{k=1}^{N} \left( \sum_{n=1}^{N} b_n A_{nk} \right) e^{-2\pi i \kappa_k (\frac{m}{M} - \frac{1}{2})}$$

$$= \sum_{k=1}^{N} \tilde{b}_k e^{-2\pi i \kappa_k (\frac{m}{M} - \frac{1}{2})}.$$

This can be interpreted (up to normalization) as a discrete Fourier transform of the symbols $$\tilde{b}_k = \sum_{n=1}^{N} b_n A_{nk}. \quad (38)$$

Figure 7:
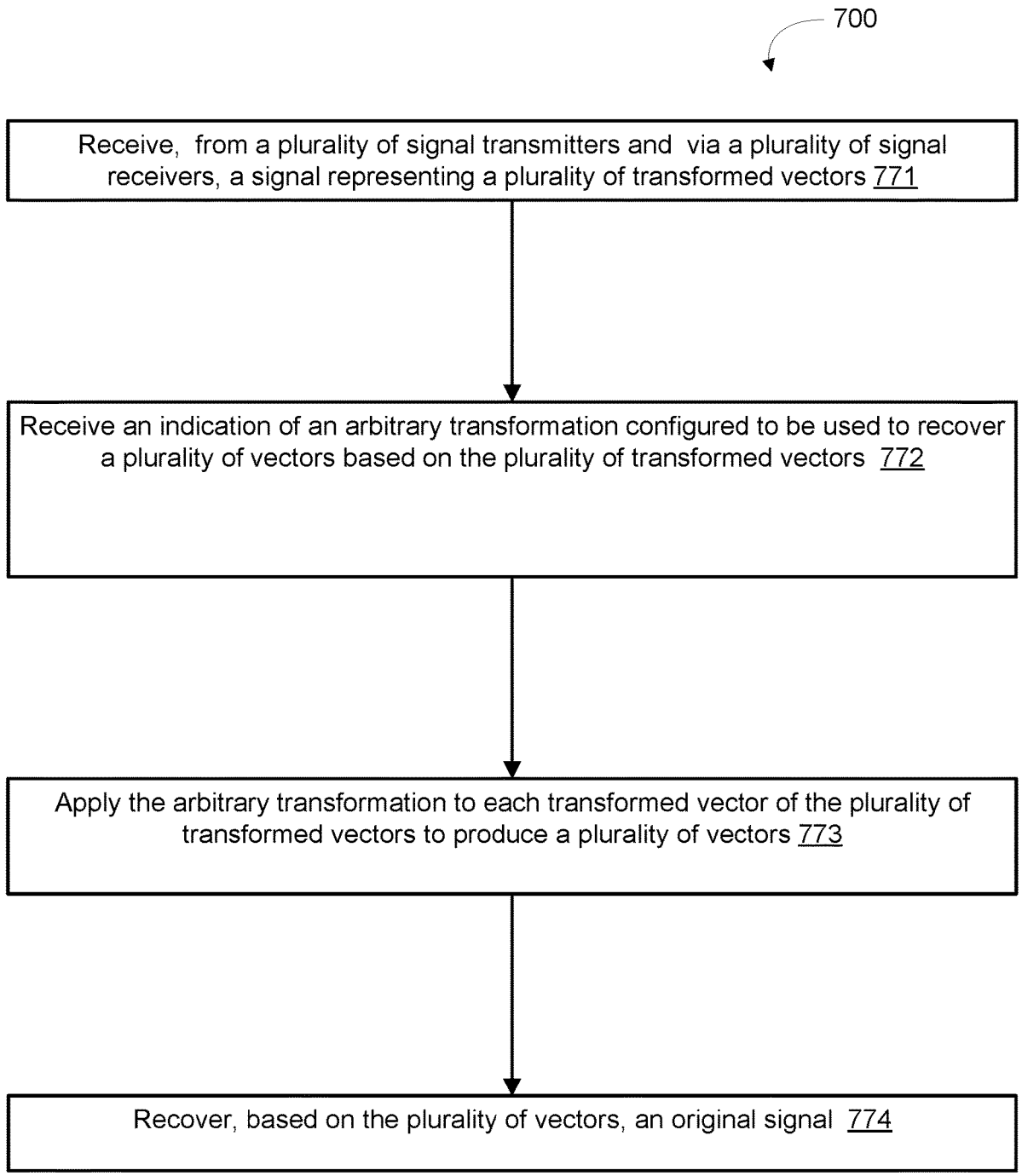
FIG. 7 is a flowchart describing a method of receiving and recovering a signal using a gUBDM system, according to an embodiment.

FIG. 7 is a flowchart describing an example method for a reception of a plurality of transformed vectors and recovery of a plurality of vectors, using a gUBDM system according to an embodiment. The method 700 can be implemented by a processor associated with a signal receiver (e.g., signal receiver 301) described herein.

At 771, the method 700 includes receiving from a plurality of signal transmitters and via a plurality of signal receivers, a signal representing a plurality of transformed vectors.

At 772, the method includes receiving an indication of an arbitrary transformation configured to be used to recover a plurality of vectors based on the plurality of transformed vectors. In some implementations, the receiving the indication of the arbitrary transformation can be from the plurality of signal transmitters and via the plurality of signal receivers. In some instances the receiving the indication of the arbitrary transformation can be prior to the receiving the signal representing a plurality of transformed vectors. In some instances the indication can include an inverse of the arbitrary transformation.

At 773, the method includes applying the arbitrary transformation to each transformed vector of the plurality of transformed vectors to produce a plurality of vectors. At 774, the method includes recovering, based on the plurality of vectors, an original signal. In some instances for example the recovering the original signal can be performed by a converter (e.g., converter 314) associated with a signal receiver. In some instances the method 700 can skip the recovering the original signal at 773 and instead store or send the plurality of vectors to another device to perform the recovering of the original signal.

Another advantage of the above described gUBDM system is that it is designed to take full advantage of the richness and structure of the unitary groups. One opportunity the gUBDM system described affords is the ability to incorporate ETF/NETFs into an adopted and modified OFDM system variation—this is something that is impossible in an OFDM system otherwise unmodified.

The gUBDM system also affords a signal transmission source the ability to include code division multiplexing into an OFDM system upon modification into a gUBDM system. This means that in addition to time division, frequency division, and spatial multiplexing, we can do code division multiplexing can be performed. This adds an enormous degree of freedom for system engineers.

It should be noted that an iFFT will still be likely performed after applying a general unitary A, in some implementations, which can make equalization easier. So, take a data vector b and send it through the steps b→Ab→FAb, where F is a Fourier transformation. However, because of the group structure of U(N), it is known that if F and A are both elements of U(N) are used, then their product will be as well. Because we are using the entire group U(N), there is no difference between claiming a single matrix A and claiming a single matrix A followed by a Fourier matrix. No matter how many unitary matrices we multiplied together, the result is still just another element of U(N).

In other words, a key advantage of this approach is the security. If the act of modulating the data is able, by itself, to fully secure the content to an eavesdropper on that channel, denying her access to the bits (or anything above OSI layer 1), then the attack surface for the eavesdropper has changed radically. All possibilities of traffic analysis attacks, protocol weakness attacks, control data leakage attacks, etc. are completely eliminated. Furthermore, in networks where the security provided by traditional encryption causes delay/latency that adversely impacts the network, the encryption (usually at OSI layer 3 or higher) can be optionally completely removed. This eliminates the space, power, heat, or time to include the encryption, as well as the overhead usually associated with encryption. Furthermore, the delays/latency associated with encryption (everything from simply having to pass the information up and down the OSI stack to the latency associated with simply having to run those bits through the cryptologic) can be eliminated. All the system needs to do is transmit. The modulation itself takes care of the security.

The signal receiver is open to any computation upon receiving the transformed signal. In some implementations, the signal receiver can simply demodulate the signal and recover the symbols and bits. In some implementations, the signal receiver may also want to store the digitized I and Q, or pass the digitized I and Q on to some other system without applying the inverse of the unitary matrix.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. A method, comprising:
    applying an arbitrary transformation to a plurality of vectors to produce a plurality of transformed vectors, the arbitrary transformation including one of a unitary transformation, an equiangular tight frame (ETF) transformation, or a nearly equiangular tight frame (NETF) transformation, the arbitrary transformation based on a matrix that is not an identity matrix or a discrete Fourier matrix;
    producing, using the arbitrary transformation, a first transformed signal based on at least a first transformed vector from the plurality of transformed vectors;

producing, using the arbitrary transformation, a second transformed signal based on at least a second transformed vector from the plurality of transformed vectors;
transmitting the first transformed signal, via a first communications channel, to a first signal receiver that is configured to detect the first transformed signal;
transmitting the second transformed signal, via a second communications channel, to a second signal receiver that is configured to detect the second transformed signal; and
providing a signal representing the arbitrary transformation to the first signal receiver and the second signal receiver, for recovery of the plurality of vectors at the first signal receiver and the second signal receiver based on the arbitrary transformation.

2. The method of claim 1, wherein the first communications channel is different from the second communications channel.

3. The method of claim 1, wherein the plurality of transformed vectors has a total magnitude that equals a total magnitude of the plurality of vectors.

4. The method of claim 1, further comprising generating the plurality of vectors, the generating including:
generating a plurality of symbols based on a plurality of input bits using a bit-to-symbol map; and
generating a plurality of blocks based on the plurality of symbols, each block from the plurality of blocks representing a vector from the plurality of vectors.

5. The method of claim 1, wherein producing the first transformed signal and producing the second transformed signal do not include the use of a spreading code vector.

6. The method of claim 1, wherein the transmitting the first transformed signal is via a first transmitter, and the transmitting the second transformed signal is performed via a second transmitter different from the first transmitter.

7. The method of claim 1, wherein the transmitting the first transformed signal and the transmitting the second transformed signal are performed using multiple access communication.

8. The method of claim 1, wherein the matrix is not a direct sum of discrete Fourier matrices.

9. The method of claim 1, wherein the arbitrary transformation includes rows that form one of an equiangular tight frame or a nearly equiangular tight frame.

10. The method of claim 1, further comprising performing an inverse fast Fourier transform (iFFT) on at least one of the first transformed signal and the second transformed signal prior to transmitting the first transformed signal and the second transformed signal.

11. The method of claim 1, wherein transmitting the first transformed signal includes spreading energy of the first transformed vector across each subcarrier from a plurality of subcarriers.

12. A system, comprising:
a plurality of signal receivers;
a plurality of signal transmitters; and
at least one processor operably coupled to the plurality of signal transmitters, the at least one processor configured to:
generate a plurality of vectors;
apply an arbitrary transformation to each vector from the plurality of vectors to produce a plurality of transformed vectors, the arbitrary transformation including one of a unitary transformation, an equiangular tight frame (ETF) transformation, or a nearly equiangular tight frame (NETF) transformation, the arbitrary transformation based on a matrix that is not an identity matrix or a discrete Fourier matrix; and
send a signal representing the plurality of transformed vectors to the plurality of transmitters for transmission of the plurality of transformed vectors to the plurality of signal receivers.

13. The system of claim 12, wherein the at least one processor is configured to generate the plurality of vectors by:
generating a plurality of symbols based on a plurality of input bits using a bit-to-symbol map; and
generating pluralities of blocks based on the plurality of symbols, each plurality of blocks from the pluralities of blocks representing a vector from the plurality of vectors.

14. The system of claim 12, wherein the plurality of transformed vectors has a total magnitude that equals a total magnitude of the plurality of vectors.

15. The system of claim 12, wherein the plurality of signal receivers includes a plurality of antenna arrays, the plurality of signal receivers and the plurality of signal transmitters configured to perform Multiple Input Multiple Output (MIMO) operations.

16. The system of claim 12, wherein the at least one processor is further configured to send a signal representing one of: (1) the arbitrary transformation, or (2) an inverse of the arbitrary transformation to the plurality of signal receivers prior to transmission of the signal representing the plurality of transformed vectors to the plurality of signal receivers, such that the plurality of signal receivers recovers the plurality of vectors from the plurality of transformed vectors based on the arbitrary transformation or an inverse of the arbitrary transformation.

17. The system of claim 12, wherein the matrix is not a direct sum of discrete Fourier matrices.

18. The system of claim 12, the processor configured to send the signal representing the plurality of transformed vectors to the plurality of transmitters via a physical layer of an open system interconnection model.

19. The system of claim 12, wherein the plurality of signal receivers is further configured to transmit a signal representing the plurality of transformed vectors to a target device.

20. A method, comprising:
generating a plurality of vectors;
applying an arbitrary transformation to each vector from the plurality of vectors to produce a plurality of transformed vectors, the arbitrary transformation including one of a unitary transformation, an equiangular tight frame (ETF) transformation, or a nearly equiangular tight frame (NETF) transformation, the arbitrary transformation based on a matrix that is not an identity matrix or a discrete Fourier matrix;
sending a signal representing the plurality of transformed vectors to a plurality of transmitters for transmission of a signal representing the plurality of transformed vectors from the plurality of transmitters to a plurality of signal receivers; and
providing the arbitrary transformation to a first signal receiver from the plurality of signal receivers and a second signal receiver from the plurality of signal receivers, for recovery of the plurality of vectors at the first signal receiver and at the second signal receiver.

21. The method of claim 20, wherein the plurality of transformed vectors has a total magnitude that equals a total magnitude of the plurality of vectors.

22. The method of claim 20, wherein the plurality of signal receivers having a plurality of antenna arrays, the plurality of signal receivers and the plurality of signal transmitters configured to perform Multiple Input Multiple Output (MIMO) operations.

23. The method of claim 20, further comprising sending the signal representing the plurality of transformed vectors to the plurality of transmitters via a physical layer of an open system interconnection model.

24. The method of claim 20, wherein the matrix is not a direct sum of discrete Fourier matrices.

* * * * *